United States Patent
Valiaveedan

[15] 3,644,270
[45] Feb. 22, 1972

[54] PROCESS FOR COLORING POLYESTERS WITH RHODAMINE, XANTHENE OR BENZOPHENYL SAFRANINE DYES

[72] Inventor: George Devasia Valiaveedan, Freehold Township, N.J.

[73] Assignee: E. I. du Pont de Nemours and Company, Wilmington, Del.

[22] Filed: Apr. 21, 1969

[21] Appl. No.: 818,139

[52] U.S. Cl. ........................................260/40 R
[51] Int. Cl. .........................................C08g 51/04
[58] Field of Search ..................................260/40

[56] References Cited

UNITED STATES PATENTS

| 3,359,230 | 12/1967 | Bowman et al. | 260/40 |
| 3,410,821 | 11/1968 | Cooper et al. | 260/40 |
| 3,413,257 | 11/1968 | Bowman et al. | 260/40 |

*Primary Examiner*—Morris Liebman
*Assistant Examiner*—L. T. Jacobs
*Attorney*—Lynn Barratt Morris

[57] ABSTRACT

A process for mass-coloring polyesters characterized that there is admixed with the bis(hydroxyalkyl) aromatic dicarboxylic acid ester before carrying out a polyesterification or condensation, one or more ionic-polycyclic-heterocyclic dyestuffs selected from the group of substituted xanthylium and 5-6 mono- and 1-2, 5-6 dibenzophenazinium sodium and ammonium salts during the polymerization. Polyethylene terephthalate can be colored in this way and formed into colored films and filaments.

6 Claims, No Drawings

PROCESS FOR COLORING POLYESTERS WITH RHODAMINE, XANTHENE OR BENZOPHENYL SAFRANINE DYES

CROSS-REFERENCE TO RELATED APPLICATIONS

This invention is relates to Assignee's pending application, Johnes et al., Ser. No. 640,827, filed May 24, 1967, now abandoned, covering the use of N,N'-diphenyldiamino-anthraquinone dyes for coloring shaped polyester articles.

BACKGROUND OF THE INVENTION

1. Field of the Invention

This invention pertains to coloring film-forming polyesters with certain multiple ring dyestuffs to produce tinted polyester films, e.g., polyethylene terephthalate films and other shaped articles.

2. Description of the Prior Art

Various methods for the coloring of hydrophobic organic polymers are known and have been applied in those industries producing organic polymer films and fibers. In general, the coloring processes for polymeric materials essentially involve dispersing or dissolving a pigment or dye therein in the polymer or by adsorption to a polymeric article. Such processes are disclosed in Assignee's Pascal, U.S. Pat. Nos. 3,098,691 and 3,107,968, wherein acid-modified acrylic fibers are colored with water-insoluble multiple ring dyes in dioxane and pyridine baths respectively. Although acid systems are normally run at preferred temperatures between 80° and 105° C., the coloring step may be shortened by raising the temperature to 200° C. However, the elevated temperature may result in decomposition of the dye. In addition to the latter systems, R. Meek et al., U.S. Pat. No. 3,278,468, discloses a process wherein the dye is incorporated in the monomeric material and becomes a part of the integral polymeric structure. In this instance, monomeric- polyfunctional amines are caused to react with polyfunctional acid dye molecules or with polyfunctional acids in the presence of a polyfunctional dye molecules capable of reacting with either the amine or the acid to yield a colored polyamide.

Heretofore, particular-substituted anthraquinonic anthrapyridonic, anthrapyrimidine, isothiazolanthronic and phthaloylacridonic dyestuffs such as those taught in Bowman et al., U.S. Pat. Nos. 3,413,257, 3,424,708, and Assignee's copending application Ser. No. 640,827, involved dyeing polyesters at high temperatures during polymerization. It is desirable that the dyestuffs be capable of withstanding high temperatures up to 290° C., have a low volatility and to not sublime at high temperatures and possess fastness to light, dry cleaning solvents, and photographic processing solutions.

It has been found that certain dyes of the rhodamine or Xanthene and benzophenyl safranine classes are suitable for coloring synthetic polyesters during polymerization and prior to the formation of shaped articles.

In accordance with said copending application, Ser. No. 640,827 disclosed, supra, and the prior art, wherein N,N'-diphenyldiaminoanthraquinone dyes are used to color linear polyesters, it has been found that the particular dyes that are described below possess the desired properties and have high-tinctorial strength, and their use results in novel tinted or colored products of the invention.

SUMMARY OF THE INVENTION

This invention relates to a process for imparting color to hydrophobic linear polyesters by addition of particular substitued xanthenes or rhodamines and benzophenyl safranine dyes to liquefied bis(hydroxyalkyl) aromatic dicarboxylic acid esters during or after their preparation and prior to their condensation to form polyesters. The polyester may be the condensate resulting from (1) reaction of a dicarboxylic acid, acid halide, or dialkyl ester with a glycol to form a bis(hydroxyalkyl)dicarboxylic acid ester by direct esterification or catalyzed ester-interchange, and (2) subsequent polyesterification. The dyes are present in the liquefied bis(hydroxyalkyl)dicarboxylic acid ester or admixed therewith as the polyesterification begins.

More precisely 0.015 to 1.0 gms of a 2,7-(N,N'-dianilino) 10 ortho benzoate xanthylium salt, an 8,9-benzo-3,7-(N,N'-dianilino) phenazine or certain derivatives thereof are added per pound of bis ester prior to polymerization at 280° to 305° C. Accordingly tinted shaped articles or photographic film supports may be obtained therefrom upon extruding and biaxially orienting the colored hydrophobic super polyester film.

DESCRIPTION OF THE PREFERRED EMBODIMENTS

In practicing the preferred embodiments of this invention it is desired that a polycyclic-heterocyclic ionic dye such as benzophenazine, pyronine or xanthylium salt be added to the monomer of a linear polyester. A preferred polyester may be the condensation, product of a monomeric aromatic polycarboxylic acid, ester or anhydride and a polyhydric alcohol having two or more OH groups, $HO(CH_2)_nOH$ wherein $n$ is 2 to 10, e.g., that of a dimethyl terephthalate and ethylene glycol, as described in Sorenson and Campbell, Preparative Methods of Polymer Chemistry, Interscience, New York, (1961) pp. 113. Preparation of said polyester involves two ester exchange reactions under vacuum and nitrogen wherein a small amount of a catalyst is used, e.g., metals, metal salts, mercuric or antimony oxides, calcium acetate dihydrate, zinc acetate dihydrate and various other catalysts containing alkaline and alkaline earth metals.

The monomer, preferably bis(2-hydroxyethyl) terephthalate, is formed upon addition of excess ethylene glycol to dimethyl terephthalate in a reaction vessel equipped with a condenser, stirrer, and nitrogen purge system. Said vessel is immersed in an oil bath or suitable reservoir capable of sustaining the desired high temperatures for several hours. The catalyzed reaction system is heated to approximately 197° C. and the last traces of the methanol released during polycondensation are removed by distillation as the nitrogen flow and vacuum pressure are reduced. At this point, there may be admixed with the bis(2-hydroxyethyl) terephthalate 0.015 g. or more per pound of monomer and one or more rhodamine dyes of the formula:

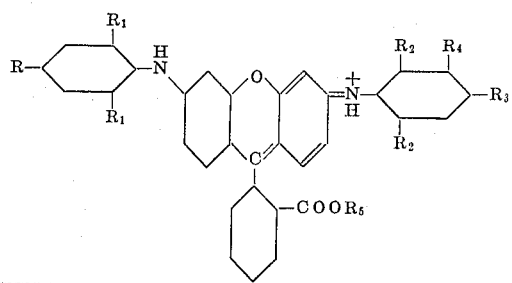

wherein R may be H, $-CH_3$, or $-C_2H_5$, $R_1$ and $R_2$ are H, or $CH_3$, $R_3$ is H, $SO_3^-$, $CH_3$, or COOH, and $R_4$ is H or $SO_3^-$. In some instances, R and $R_3$ may be identical or $R_3$ is $SO_3^-$ when R is H and $R_5$ may be Na or H, unless ionization of the carboxyl group, $COO^-$, is indicated.

The resulting mixture is heated under a nitrogen atmosphere and excess ethylene glycol is gradually distilled therefrom as the temperature is slowly increased to approximately 220°–240° C. The supply of nitrogen is then shut off and pressure is reduced to 0.3 mm. or less. The polymerization reaction is maintained under these conditions of vacuum for 1 hour. The polymerization is continued at 285°–290° C. for 3 hours. Stirring is adjusted to compensate for the change in viscosity. Upon completion of the reaction, the vacuum is slowly released, as the tinted polymer is allowed to cool under a slow, steady stream of nitrogen gas. The yield of tinted polymer is quantitative, since no dimethyl terephthalate is distilled in the early phases of polymerization. Accordingly, the resulting uniformly tinted polymer having a melting point of about 254°–255° C. was very viscous and possessed good cold-drawing properties.

In place of the rhodamine dyes, there may be dispersed in the molten polyesterification system similar amounts of the substituted xanthene dyes of the formula:

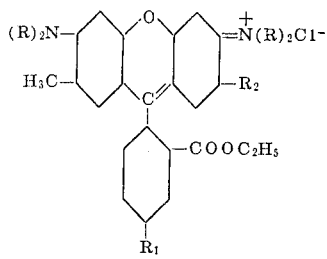

II wherein R may be $CH_3$ or $C_2H_5$, $R_1$ is H or $SO_3Na$ when the ethylcarboxylate radical is replaced by a $SO_3^-$ group and $R_2$ is H or $-CH_3$. When the ethylcarboxylate radical above is replaced by $SO_3$, the $Cl^-$ is not present. When numerically designating substitutions as indicated on page C35 of The Handbook of Chemistry and Physics, 49th Edition, Chemical Rubber Company, Ohio, 1968, a dye structure may comprise two 6-amino, 7-methyl xanthenyl groups similar to that of formula II. In this instance, Q and M are hydrogen atoms.

The preferred dyes of the benzophenyl safranine type essentially comprise heterocyclically substituted phenazines which may or may not have a benzo ring contiguously attached thereto between two adjacent carbon atoms. Said dyes which have the desired properties and when used in the above prescribed amounts are capable of tinting the bis(2-hydroxyethyl)terephthalate during the polyesterification have the following general formula:

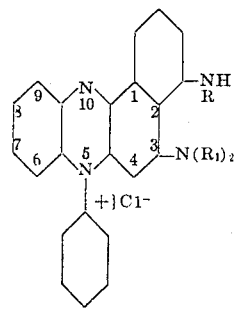

III wherein R may be a phenyl group, or an anilino group having an N-methyl or ethyl- substituted radical in para position, and the groups may contain further substituents, e.g., $SO_3$, — $SO_3Na$ and —$CH_3$. $R_1$ is a —$CH_3$ or $C_2H_5$ group. Such dye structures are of the type illustrated on pages 3417–3418 of the Color Index, Second Edition, Volume 3.

Mixtures of one, two, or more of dyes of formulas I and/or II and/or III can be used for obtaining the tinted or colored polyester products, and the products can be converted to films, plates, filaments, or fibers, etc. The dyes can be added conveniently from solution in ethylene glycol.

TABLE

| Dye Number | Color index identifiaction |
|---|---|
| 50300 | Acid dye |
| 50305 | Basic blue 14 |
| 50306 | Basic blue 13 |
| 50310 | Acid blue 121 |
| 50315 | Acid blue 59 |
| 50320 | Acid blue 102 |
| 50330 | Acid blue 61 |
| 50335 | Acid blue 98 |

There can be used according to the invention the dyes in the foregoing Table, and the dibenzophenyl safranines on page 3419 of the same reference: 50370 Acid Dyes and 50375 C. I. Basic Red 6.

When used to tint photographic film supports, the abovementioned dyes offer a unique advantage in that they are leach resistant and the colors thereof will not degrade. During high temperature (180°–300° C.) condensation, said dyes are uniformly dispersed and become integral parts of the tinted articles, films, etc., produced therefrom.

In accordance with this invention, it is required that dyes be soluble in the molten polyester and stable at 290°–300° C. for several hours, resistant to sublimation under high vacuum of 1 mm. of mercury or less under polymerization conditions and possess appreciable tinctorial strength at a concentration of 0.015 gms. or more per pound of monomer. In addition, said dyes must not have absorption peaks which would hinder the photographic effect. Also, the dispersed dyes must remain fast and resistant to solutions throughout the shaped article, such as photographic films, and not be leached therefrom during processing. Particularly useful for the process described herein are certain rhodamine or substituted xanthylenium salts and substituted mono and dibenzophenazines produced by the conventional methods disclosed on pages 3385–7 and 3417–19 of the Color Index, Second Edition, The American Association of Textile Chemists and Colorists, Lowell, Mass., 1957.

The preferred class of xanthylium salts or amino-derivative (fluorine coloring matter), are identified on page 3385 of the Color Index, (see above).

Any of the preferred dyes may be employed separately or in combination. Also said preferred dyes may serve in admixture with additional dyes or pigments normally not applicable to the molten-coloring process disclosed herein. Coloring substances rendered useful upon admixing the same with a preferred dye are the phthalocyanines, particularly copper phthalocyanine such as Monastral Blue. Said deep blue pigment is exceedingly stable at high temperatures and vacuum conditions for limited periods. However, when incorporated into the polyester melt system such as that embodying this invention, said Monastral Blue yielded a greenish-blue tint instead of the desired blue color. Accordingly the preferred dyes are capable of intensifying the hue leaching out of any additional coloring substance which may sublime or incur color degradation.

The following examples illustrate the production of polyesters tinted with a preferred dye or combination thereof but are not intended to limit the invention as such.

EXAMPLE I

Apparatus for coloring approximately 1 pound of "-monomer" of the preferred linear polyester, polyethylene terephthalate, during polymerization was assembled. A three neck-flask similar to a resin kettle was partially immersed in a silicone bath. In this instance, 450 gms. of bis(2-hydroxyethyl)terephthalate, 0.0114 gms. isopropyltitanate and 0.03 gms. of zinc acetate were added to the reaction vessel. To said vessel, there was added 0.1 g. of Pontacyl Fast Violet VR (Acid Violet 9, C. I. 45,190) having the following structural formula:

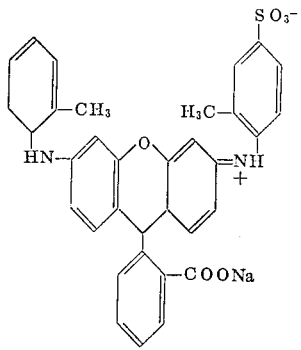

in ≈100 mls. of ethylene glycol.

The center neck was provided with a stainless steel stirrer having an air driven motor. A nitrogen rotameter purge system was connnected to one neck. To the third neck there was attached a condenser with a glycol receiver flask.

A slow steady stream of nitrogen was introduced to the agitated mixture and glycol distilled therefrom, as the vessel was gradually heated to about 230° C. The nitrogen purge was discontinued and a vacuum of 0.6 mm. was sustained for 2 hours and 7 minutes at 280° C. Stirrer adjustments were made to compensate for the rise of inherent viscosity.

Shortly thereafter, chips of the cooled tinted polymer were sandwiched between two, one-twentieth inch thick chrome ferroplates. Said plates having highly polished surfaces had been treated with a conventional resin moulding release lubricant, i.e., silicone resin, and preheated to 275° C. in an oven for 1-2 hours. The sandwichlike arrangement was then placed in a conventional preheated laboratory melt press, provided with a device for mounting the platens. The platens were preheated for 1 minute at 275° C. and drawn together under 15,000 pounds pressure for 1 minute at 282° C. The hot film and plate assembly was immediately removed from the press and quenched in cold water prior to comparison of the same to a commercial photographic film base and a film without dye prepared under the similar conditions. The film without the dye had a slightly yellowish tint throughout. However, the film so obtained having the Pontacyl Fast Violet VR therein had a uniform violet color equivalent to that of the commercial film and had excellent fastness to light.

EXAMPLE II

A sufficient quantity of the prescribed monomer was prepared for coloring 2 samples with 2 particularly preferred benzosafranines or substituted-ionic benzo phenazinyl salts, (1) Pontacyl Wool Blue BL (Acid Blue 59, C. I. 50,315) and (2) Pontacyl Wool Blue GL (Acid Blue 102, C. I. 50,320). Said dyes were added in an amount of 0.1 g. in 100 ml. of ethylene glycol per 450 gms. of monomer in each sample.

Reaction conditions and results are charted below.

TABLE I

| | Process temperature, ° C. | Vacuum pressure, mm | Process time, hrs. | Color |
|---|---|---|---|---|
| 1 Pontacyl wool blue BL | 285 | 1.5 | 2 | Purple |
| 2 Pontacyl wool blue GL | 280 | 1.7 | 1.55 | Do. |

Sample colors were fast and there was no indication of dye sublimation.

EXAMPLE III

A large quantity of polyethylene terephthalate tinted with a preferred dye was prepared for use as photographic film base as described in assignee's U.S. Pat. No. 2,905,707. A metallic salt of a weak acid anion served as a suitable catalyst as the dyestuff was admixed with the monomer, bis-(2-hydroxyethyl) terephthalate in the ester exchange vessel. Although the dyes may be added directly to the reaction vessel, they are normally made into a slurry, prior to addition to the monomer, to facilitate dispersion. In this instance a slurry with of an ethylene glycol solvent, having 2 parts of a magenta, and 1 part of a blue dye in combination with an aqueous carbon black dispersion comprised the following:

| Ingredient | Parts by Weight | Approximate Equivalent Ratio to Monomer |
|---|---|---|
| *Aqua blak | 23.4 | 50.0 p.p.m. |
| Milling blue base BL | 800.0 | 30.9 p.p.m. |
| Pontacyl Fast Violet VR | 30.0 | 15.4 p.p.m. |
| Ethylene Glycol | 2,147.0 | — |
| Total: | 3,000.0 | |

*A 45% aqueous carbon black solution produced by Columbian Carbon Company of New York.

The red and blue dyes were ball-milled separately in an appropriate quantity of ethylene glycol by conventional methods prior to admixing in the slurry. The Aqua Blak solution was added last to the bulk glycol in the slurry container to avoid agglomeration.

In a continuous process, the above-described slurry was introduced to the bis(2-hydroxyethyl) terephthalate formed in the ester exchange vessel in a ratio of 1:48.6 parts by weight of finished blue tinted polyethylene terephthalate. The heat softened polymer is extended 275° C. or more to a cooled-casting roll wherefrom the web is transferred and biaxially stretched to desired dimensions after subcoating. The film base having a thickness of 0.004 inch was coated on each side with a resin substratum layer comprising vinylidene chloride, methylmethacrylate, itaconic acid, and ethyl acrylate as described in Rawlins, Ser. No. 494,257 filed Oct. 8, 1965. A gelatino silver bromoiodide photosensitive layer of 96±2 mgs./dm.² was applied to one side of the subcoated base. Said layer contained 2.5 percent of AgI and 97.5 percent of AgBr and 170 gms. of gelatin per 0.282 gms. of silver halide admixed with conventional emulsion ingredients such as the binder hardeners, surfactants, antifoggants, optical and chemical sensitizers, etc. In this instance gelatin was the binder.

However, other natural or synthetic water permeable or water-soluble colloid binding agents would be suitable.

The photosensitive emulsion may be protected by an antiabrasion coating, e.g., of gelatin to which matting agents such as starch, $SiO_2$ particles, polymeric lattices, etc., may be added. The emulsion of the sample referred to herein is provided with a hardener which functions as a protective agent.

A sample film bearing the above-described negative emulsion and a control film were simultaneously exposed for one-fiftieth of a second on a Negative 1BS sensitometer with a neutral density step wedge. Said step wedge had 20 steps of variable densities decreasing by a factor of $\sqrt{2}$. A commercial film bearing a similar emulsion layer was the control. Shortly thereafter the exposed films were developed in a conventional metol-hydroquinone developer for 6 minutes, fixed in a thiosulfate hardening bath for 10 minutes and immediately rinsed. The dry processed films were the compared.

It was observed the mixture of dyes, as described above and when used according to this invention, have no adverse effect on the sensitometric properties of the photographic emulsion nor on physical properties of the polyethylene terephthalate support.

EXAMPLE IV

Using apparatus suitable for mass-coloring approximately 1 pound of bis(2-hydroxyethyl) terephthalate during polyesterification by the process and conditions described in Example I, as preferred substituted xanthene or rhodamine dye and a Monastral Blue pigment were prepared. In this instance, 125 mg. of Monastral Blue BWD or copper phthalocyanine having the formula:

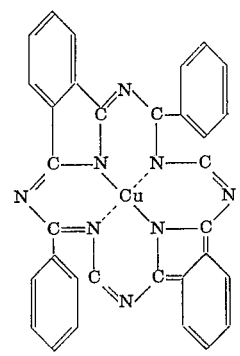

and 250 mg. of Pontacyl Fast Violet VR (Acid Violet 9, C. I. 45,190) were admixed in a small amount of ethylene glycol prior to addition to the reaction vessel containing 454 gm. of the above-mentioned monomer.

The reaction was allowed to continue for 1 hour and 15 minutes at 285° C. under 1.33 mm. vacuum. No intrinsic viscosity problems were encountered. Upon cooling and subsequent removal of the formed-tinted polyester from the reaction vessel, film samples were prepared and evaluated in the prescribed manner. The resulting film samples had uniform blue tints throughout, and the dye mixture dispersed therein remained fast to washing.

Accordingly the stable-tinted films of this invention may be used as photographic film base, packaging materials, color filters or supports for other photosensitive materials such as photopolymerizable elements and other graphic arts products, etc.

The embodiments of the invention in which an exclusive property or privilege is claimed are defined as follows:

1. A process for imparting color to a hydrophobic, film-forming polyester characterized in that there is incorporated with a bis(hydroxyalkyl) aromatic dicarboxylic acid ester before it is converted to a polyester at an elevated temperature a small amount of one or more of the dyes of the following formulas:

[Structure I]

wherein R is H, $-CH_3$, or $-C_2H_5$; $R_1$ and $R_2$ each are H or $-CH_3$; $R_3$ is H, $-SO_3^-$, $-CH_3$ or $-COOH$, and $R_4$ is H or $-SO_3^-$, $R_5$ may be H or $CH_3$,

[Structure II]

wherein R is $-CH_3$ or $-C_2H_5$; $R_1$ is H or $-SO_3Na$ when the ethylcarboxylate radical is replaced by an $-SO_3^-$ group and then a $Cl^-$ion is not present, $R_2$ may be H or $CH_3$, and

[Structure III]

wherein R is phenyl or anilino group having an N-methyl or N-ethyl radical in the para position, which groups can be further substituted with $-SO_3^-$, $-SO_3Na$, or $-CH_3$ radicals, and $R_1$ is $-CH_3$ or $C_2H_5$.

2. A process according to claim 1, wherein the dye is present during formation of the bis- ester.

3. A process according to claim 1, wherein the dye is added after formation of the bis- ester and before the polyesterification is effected.

4. A process according to claim 1, wherein the polyester is polyethylene terephthalate and the acid ester is bis(2-hydroxyethyl) terephthalate.

5. A process according to claim 1 containing only one dye.

6. A hydrophobic polyester film tinted or colored with one or more of the dyes defined in claim 1.

* * * * *